(12) United States Patent
Monti et al.

(10) Patent No.: US 12,051,153 B2
(45) Date of Patent: Jul. 30, 2024

(54) SYSTEM AND PROCESS FOR CREATING A THREE-DIMENSIONAL MODEL OF A REAL ESTATE DEVELOPMENT SITE

(71) Applicant: RENAISSANCE V&A TECHNOLOGIES LLC, Jericho, NY (US)

(72) Inventors: Donald S. Monti, Glen Head, NY (US); Kevin D. Devito, Redondo Beach, CA (US); Michael Fusco, Middle Island, NY (US)

(73) Assignee: RENAISSANCE V&A TECHNOLOGIES LLC, Jericho, NY (US)

( * ) Notice: Subject to any disclaimer, the term of this patent is extended or adjusted under 35 U.S.C. 154(b) by 107 days.

(21) Appl. No.: 17/577,284

(22) Filed: Jan. 17, 2022

(65) Prior Publication Data
US 2022/0230389 A1    Jul. 21, 2022

Related U.S. Application Data

(60) Provisional application No. 63/138,730, filed on Jan. 18, 2021.

(51) Int. Cl.
*G06T 17/05* (2011.01)
*B64C 39/02* (2023.01)
(Continued)

(52) U.S. Cl.
CPC ............ *G06T 17/05* (2013.01); *B64C 39/024* (2013.01); *G06F 16/29* (2019.01); *B64U 2101/30* (2023.01)

(58) Field of Classification Search
None
See application file for complete search history.

(56) References Cited

U.S. PATENT DOCUMENTS 5,652,717 A    7/1997 Miller
6,732,120 B1    5/2004 Du
(Continued)

FOREIGN PATENT DOCUMENTS

| WO | 2011/031795 A1 | 3/2011 |
| WO | 2012015733 A1 | 2/2012 |
| WO | 2012057841 A2 | 5/2012 |

OTHER PUBLICATIONS

A Citizen's Guide to Planning, California, 2001 Edition, http://ceres.ca.gov//planning/planning_guide/plan_indiex.html; Dec. 15, 2014; 13 pages.
(Continued)

*Primary Examiner* — Tize Ma
(74) *Attorney, Agent, or Firm* — Collard & Roe, P.C.

(57) ABSTRACT

There is disclosed a system and process for creating a graphical representation of a re-development location. The system can perform the process of locating a region based upon a primary criteria. Next the system can then evaluate the region in its current state based upon social criteria, and then evaluate the region in is future re-developed state based upon future social criteria. Next, the system can perform the step of evaluating the region in its current state based upon environmental criteria and also perform the step of evaluating the region in its future re-developed state based upon future environmental criteria. Next, the system can perform the step of evaluating the region in its current state based upon economic criteria, and then perform the step of evaluating the region in its future re-developed state based upon future economic criteria. Finally, the system can perform the step of presenting the re-developed site graphically via a three-dimensional representation of the re-developed location including data associated with the social criteria, the environmental criteria, and the economic criteria.

27 Claims, 15 Drawing Sheets

(51) Int. Cl.
*G06F 16/29* (2019.01)
*B64U 101/30* (2023.01)

(56) References Cited

U.S. PATENT DOCUMENTS

| | | | |
|---|---|---|---|
| 7,611,602 B2 | 11/2009 | White | |
| 8,103,445 B2 | 1/2012 | Smith et al. | |
| 11,074,447 B1 * | 7/2021 | Fox | G06N 3/08 |
| 11,443,246 B2 * | 9/2022 | Gueye | G06Q 50/01 |
| 2004/0260573 A1 * | 12/2004 | Schmitt | G06Q 40/06 |
| | | | 705/36 R |
| 2005/0268245 A1 | 12/2005 | Gipps et al. | |
| 2008/0097768 A1 | 4/2008 | Godshalk | |
| 2008/0281673 A1 | 11/2008 | Davis | |
| 2008/0282203 A1 * | 11/2008 | Davis | G06Q 50/165 |
| | | | 715/863 |
| 2009/0144097 A1 | 6/2009 | Fassio et al. | |
| 2010/0286937 A1 | 11/2010 | Hedley et al. | |
| 2011/0295575 A1 | 12/2011 | Levin et al. | |
| 2013/0132846 A1 | 5/2013 | Martin | |
| 2015/0100285 A1 | 4/2015 | Heidinger et al. | |

OTHER PUBLICATIONS

U.S. Office Action in U.S. Appl. No. 13/565,312 dated Dec. 18, 2014.
U.S. Office Action in U.S. Appl. No. 14/062,864 dated Jan. 9, 2017.

* cited by examiner

FIG. 8  EVALUATION AND GRADING MATRIX
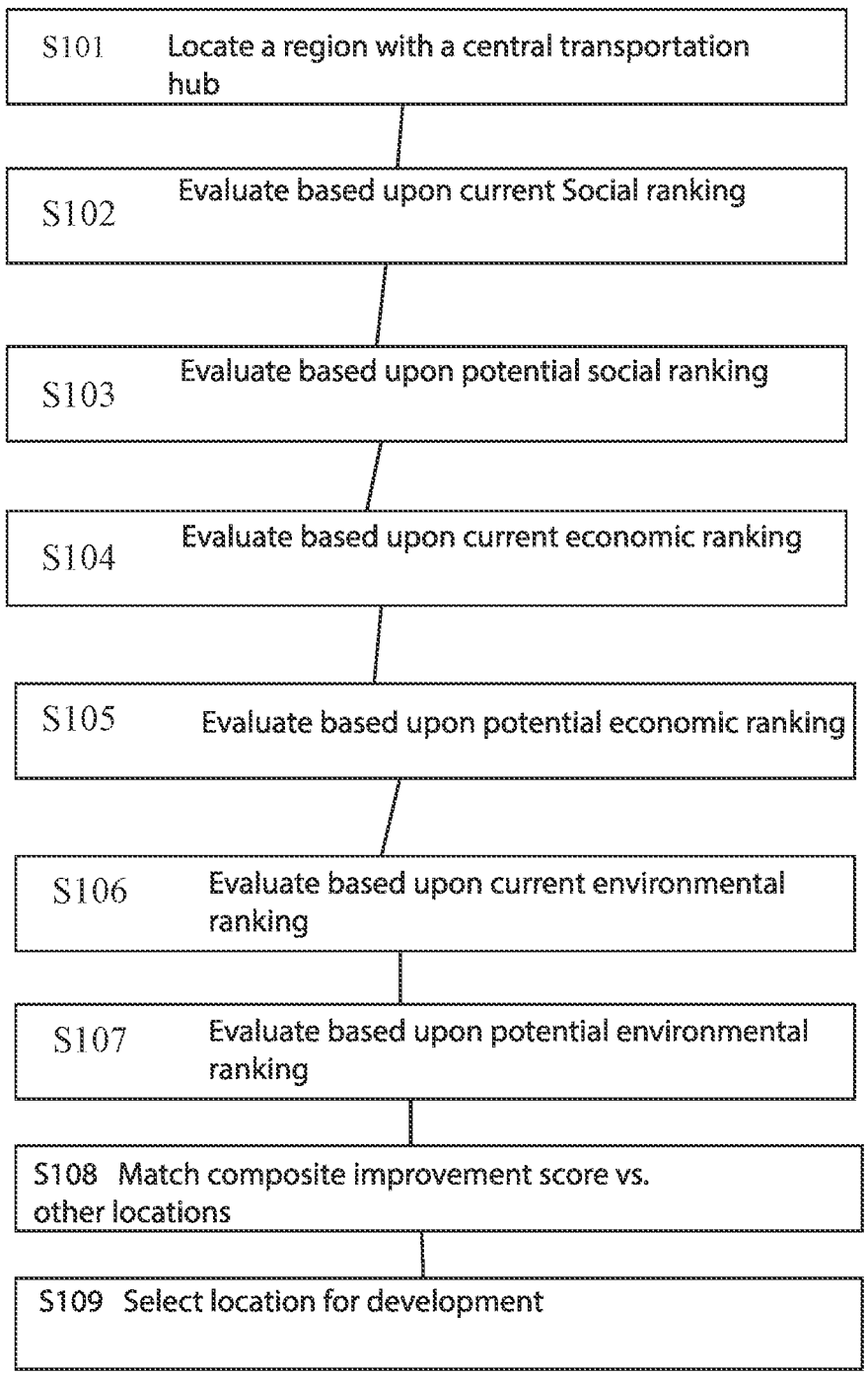

| Category | Current Score | RDT Improvement Score |
|---|---|---|
| Community Outreach | 35 | 99 |
| Social Engagement Accessibility | 48 | 89 |
| Access to Parks | 75 | 89 |
| Neighborhood Quality | 45 | 85 |
| Education Scores | 35 | 60 |
| Age Diversity | 55 | 85 |
| Diversity Index | 85 | 95 |
| Internet Access | 65 | 99 |
| Walk Score | 85 | 99 |
| Bike Score | 45 | 65 |
| Bus Score | 85 | 95 |
| Rail Score | 85 | 95 |
| Housing Options | 55 | 85 |
| Healthcare Quality | 40 | 60 |
| Healthcare Access | 45 | 65 |

FIG. 15

| Category | 10 Year Totals |
|---|---|
| Property Taxes - 10 Year | $ 28,853,240 |
| Sales Tax Revenue - 10 Year | $ 118,832,005 |
| Total Non-Construction Economic Activity – 10 Years | $ 2,895,074,842 |
| Total Construction Materials | $ 931,698,000 |
| Total Labor Construction | $1,416,195,000 |
| Community Benefit Agreements (revenues) | $ 11,000,000 |
| Total Construction Jobs Created | 45,500 |
| Total Permanent Jobs Created | 93,567 |
| New Jobs Police/Fire/Sanitation | 120 |
| New Retail Square Footage | 987,000 square feet |
| Contribution to Education | $ 86,022,500 |
| New Housing Created | |

SYSTEM AND PROCESS FOR CREATING A THREE-DIMENSIONAL MODEL OF A REAL ESTATE DEVELOPMENT SITE

CROSS REFERENCE TO RELATED APPLICATIONS

This application is a non-provisional application that claims priority from U.S. Provisional Application Ser. No. 63/138,730 filed on Jan. 18, 2021, the disclosure of which is hereby incorporated by reference.

BACKGROUND OF THE INVENTION

One embodiment of the invention relates to a system and a process for creating a three-dimensional model for the redevelopment of downtowns across the globe. Previously Developers and Municipalities have struggled to rapidly create models of real estate development programs so that the plans for these downtowns could be eventually viewed and approved by the appropriate Municipal Authorities. Thus, there is a need for a system and a process for creating a three-dimensional model of a real estate development program, so that Municipalities would have the benefit of simultaneously visualizing development typologies while realizing the economic, social and environmental impacts of these development scenarios.

SUMMARY

At least one embodiment comprises a system and process for creating a graphical representation of a re-development scenario. The system can perform the process of locating a region based upon a primary criteria. Next the system can then evaluate the region in its current state based upon social criteria, and then evaluate the region in its future re-developed state based upon the resulting social criteria connected with such redevelopment. Next, the system can perform the step of evaluating the region in its current state based upon environmental criteria and also perform the step of evaluating the region in its future re-developed state based upon the resulting environmental criteria connected with such redevelopment. Next, the system can perform the step of evaluating the region in its current state based upon economic criteria, and then perform the step of evaluating the region in its future re-developed state based upon the resulting economic criteria connected with such redevelopment. Finally, the system can perform the step of presenting the re-developed scenario graphically via a three-dimensional representation of the re-developed site including data associated with the social criteria, the environmental criteria, and the economic criteria.

BRIEF DESCRIPTION OF THE DRAWINGS

Other objects and features of the present invention will become apparent from the following detailed description considered in connection with the accompanying drawings which disclose at least one embodiment of the present invention. It should be understood, however, that the drawings are designed for the purpose of illustration only and not as a definition of the limits of the invention.

In the drawings, wherein similar reference characters denote similar elements throughout the several views:

FIG. 8 is a flow chart for the further step for evaluating and grading of a location for development;

FIG. 15 is a flow of a chart for the economic implications for development.

DETAILED DESCRIPTION

Figure 1:
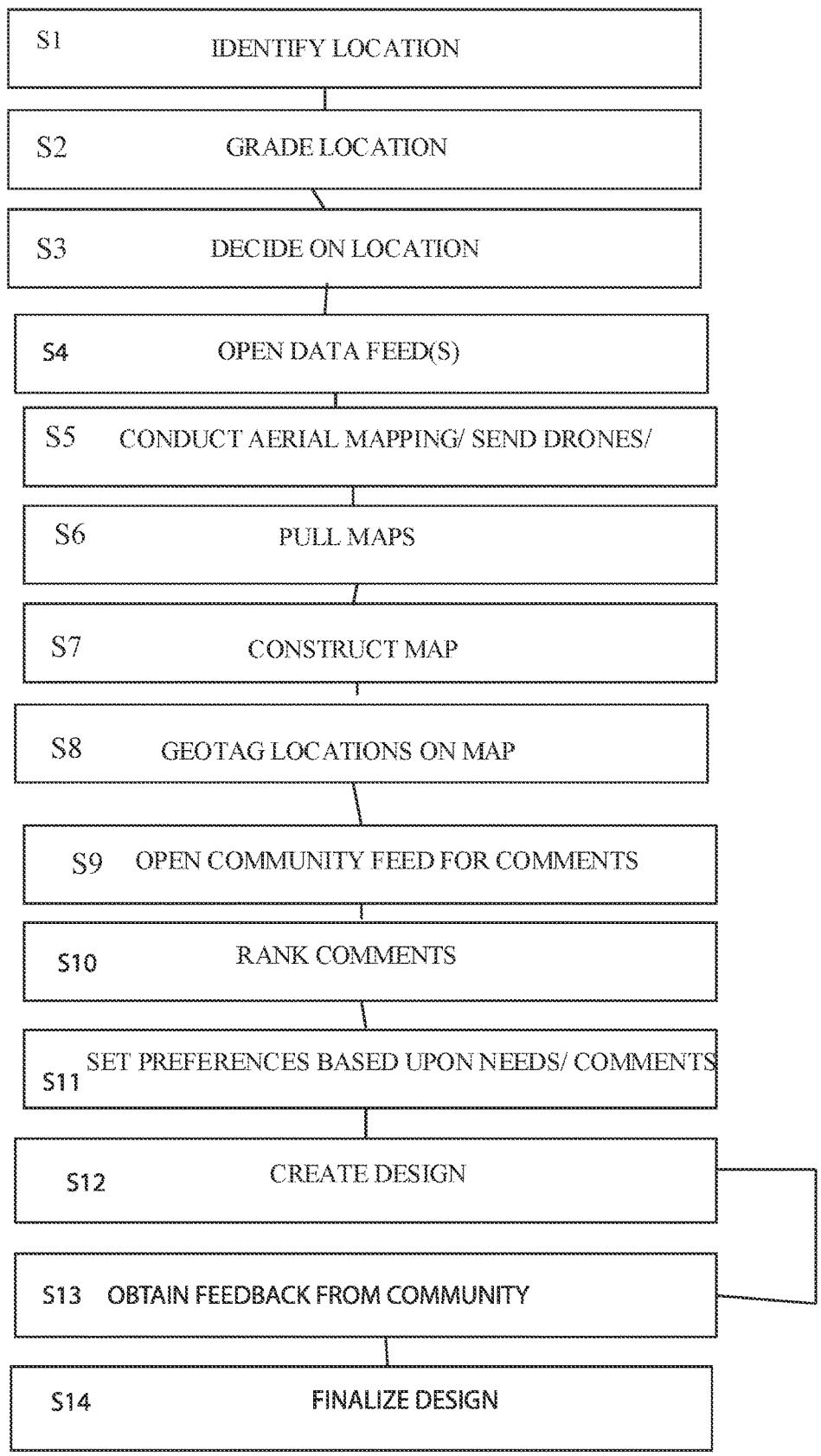
FIG. 1 is a flow chart for the process for creating a three-dimensional model of a real estate development location.
Figure 2:
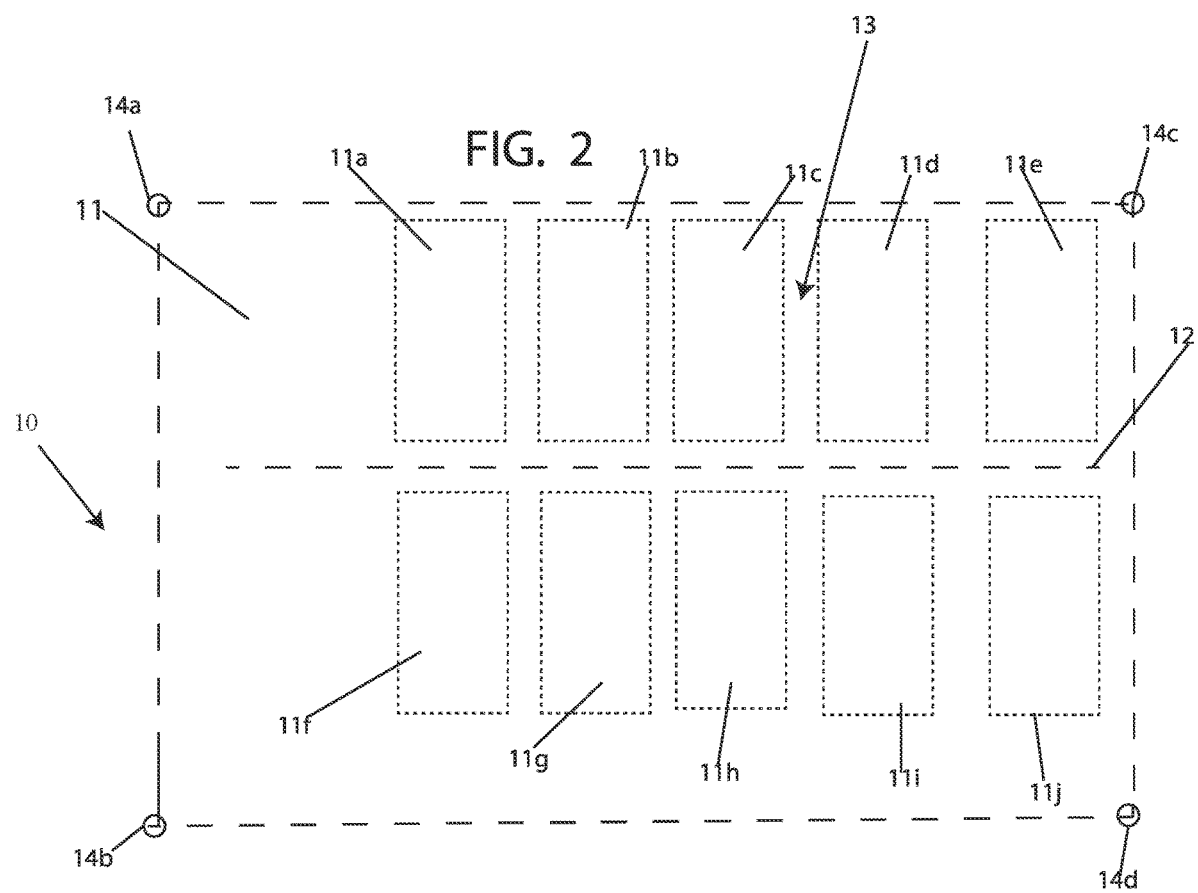
FIG. 2 is a plan view of the three-dimensional model of the real estate development location.

Referring to the drawings, FIG. 1 shows a flow chart for the process for creating a three-dimensional model of a real estate development site. This process can be performed to create a three dimensional model, a plan view of which is shown in FIG. 2 and the process is performed using for example, the computing devices shown in FIG. 3. The system as described below comprises any one of the information processing application server 51, any one of the Application servers 53, the database servers 54, or the additional components connected to these servers through a computer network such as the internet. The location for re-development could be as small as a building, a few buildings, a town or city block, a region comprising a few city or town blocks, a metro region or neighborhood such as a downtown, or even be used for an entire city or even larger.

One embodiment of a process for re-development is shown in FIG. 1 wherein system and/or the user would identify a location and/or select a downtown, or town location for re-development. A pre-set set of search or location criteria could be used such as a downtown located adjacent to mass transit such as a train station, a bus depot, bus station, an airport or other areas of high traffic and commerce. In at least one embodiment, the system/user could operate graphically so that a user, could pre-select graphically a region for analysis and grading. Other pre-selection criteria could be based upon pre-set addresses such as metes and bounds such as street addresses, GPS locations or other boundary locations. Other designations could be based upon three to four defining points on a map such as three to four GPS coordinates. Alternatively, the location could be determined as at least one central point with either a box drawn around it or a circle having a pre-defined radius. In this instance the metes and bounds whether by address, radius or street boundaries would be also translated into GPS coordinates and stored in the database and vice versa.

Next, in step S2, once the region is located, it can be graded based upon pre-set criteria to determine whether to pursue the redevelopment of this location. This step is optional and is based upon pre-set data such as the potential of this area for improvement in at least one of three categories, such as any one of Economic, Environmental or Social improvement. The Economic, Environmental and Social improvement statistics can be based upon pre-set criteria which can be downloaded from known governmental or public databases.

Figure 13:
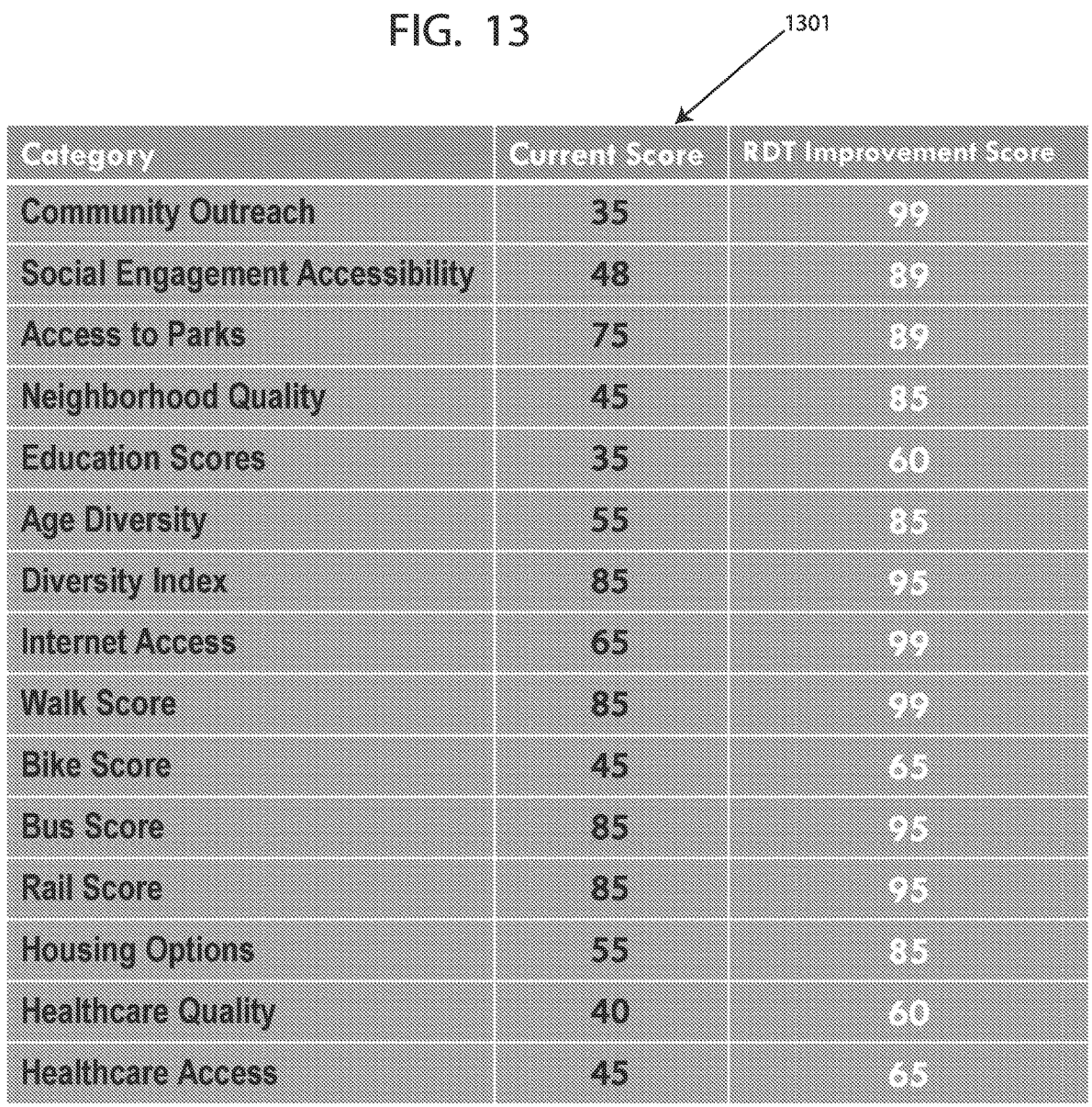
FIG. 13 is a view of a chart for social implications for development.

Examples of the different criteria for Social Impact is shown in FIG. 13 and could be any one of the following factors: Community Outreach, Social Engagement Accessibility, Access to Parks, Neighborhood Quality, Education Scores, Age Diversity, Diversity Index, Internet Access, Walk or Walkability Score, Bike Score, Bus Score, Rail Score, Housing Options, Healthcare Quality, and Healthcare Access. With respect to Community Outreach, this could be graded in the form of the ability of community leaders being able to reach their fellow citizens. With respect to Social Engagement Accessibility, this could be based upon the number of Governmental and Not for Profit Organizations available in the community, as well as festivals, events as well as regions or neighborhoods for social engagement such as the theater, libraries, number of restaurants etc. Access to parks could be based upon the number of parks in the vicinity of the community as well as the overall size of the parks and the ease at which the citizens have access to the parks such as through foot paths, bike paths, roads, and/or mass transit. With respect to the Neighborhood Quality, it could be based upon the crime statistics as well as the overall price and price trends of the housing in the area. With respect to Education Scores, this could be based upon the overall grade of the schools, which can be taken from governmental databases. With respect to Age Diversity this can be taken from overall demographic statistics such as that obtained from open governmental databases and can be graded based upon the mean and median age as well as the deviation from the mean of the community vs. the state or national averages. With respect to Diversity Index, this could be taken from the general census tracking of the racial and cultural statistics of the citizenry in the community. With respect to the internet access the bandwidth and different providers are assessed to determine the potential for internet access for the citizens of the location. With respect to the Walk or Walkability score, the community or location is analyzed for the number of foot paths or sidewalks that are available to citizens or whether there are roads that are temporarily or permanently blocked off to cars to allow people to walk through the neighborhood. With respect to Bike Score, this could be based upon the number of bike paths that are available in the location. With respect to Bus score, this is based upon the available bus routes in the location. With respect to Rail Score, this is based upon the access to rail lines that the citizens of the location have. With respect to Housing Options, this is based upon the number of different housing typologies that are available. With respect to Healthcare Quality, this is based upon the ranking and reviews of the medical centers such as hospitals and clinics that serve the community. With respect to Healthcare Access, this would be based upon the number of hospitals, clinics and other healthcare providers that are available and their proximity to the community.

Figure 14:
FIG. 14 is a view of a chart for the environmental implications for development.

Examples of Environmental factors are listed in FIG. 14, and would be any one of a Solar Energy Assessment, such as the possibility for applying solar panels to the top of buildings, including the type of buildings and the regulation associated with implementing solar panels on those buildings. Another would be Roadway Pollution, which can be in the form of air pollution from automobiles, or vehicles, or oil or gasoline or other solvents from the autos, or other materials left on the roadways. Another criteria would be based upon the Carbon Footprint of the buildings, including the footprint based upon cement, oil or petrochemical use, such as heating or other carbon production. Another would be based upon the LEED score for Energy based buildings based upon the current construction of the buildings, and the regulation or subsidies governing the construction of buildings in a LEED based manner. Daylight/Shade coverage can be based upon the availability of the sun to a particular location or based upon the open spaces or based upon the height of the buildings or vegetation. Another score is based upon the Congestion both in terms of the density of the housing, the roads, and the people (population density) in the region and the ability of traffic to move in this region. Vegetation or Trees can be assessed which can be scored based upon the type, size and number of trees and/or vegetation in the community and the ability to plant more trees and vegetation in the community. Urban Garden Access could be assessed which could cover the availability that certain citizens have access to gardens or other regions. Another score could be based upon Green Roof Access, which is based upon the number of rooftop gardens or vegetation on the rooftops or the ability of people to put vegetation on their rooftops. Traffic Calming can be based upon the ability to reduce traffic as it enters the neighborhood both before and after the re-development. Another is based upon the Energy Savings from the re-development of the location or region this could be based upon the amount of renewable energy and other energy saving features that can be introduced. Another is based upon the Water Savings which can be created by the re-development which includes the current water use score as well as the water use score after re-development. Another criteria can be based upon the water re-use for irrigation, wherein previously used water that could be re-used for irrigation of plants etc.

Furthermore, as shown in FIG. 15, Economic Criteria can be used. Some of the many factors that may be used include but are not limited to an assessment of Property Tax change from re-development. Another criteria can be the Sales Tax Revenue. The system can also calculate the total Non-Construction Economic Activity created by the re-development. Another is based upon the Total Construction Materials. Another is based upon the total Labor Construction economic activity such as the labor payroll and the other Labor Construction economic activity. Community Benefit Agreements can be assessed which are in the form of a contract signed by community groups and a real estate developer that requires the developer to provide specific amenities and/or mitigations to the local community or neighborhood. Another assessment is based upon the total construction Jobs Created such as for buildings, roads, monuments etc. The system can also assess the new jobs created for Police, Firemen, and Sanitation Workers along with the potential for thousands of newly created permanent jobs, careers and entrepreneurial opportunities created by the redevelopment. Another assessment can be based upon the new retail, office, hospitality, healthcare, restaurant, entertainment, cultural and other categories created by this redevelopment. Another assessment can be based upon the contribution of the re-development to Education spending or funding. Another economic activity can be based upon the new housing typologies created from this re-development which can be based upon the total economic value of this new housing.

Next, in step S3, the user or the system can decide on a location for re-development. This decision can be based upon the potential that the user or the system determines for the region that has been selected. The potential is based upon any one or more of the criteria discussed above.

Next, in step S4 the system can open the pre-selected data feeds to allow for further information to flow into the server. This further information can be in the form of data feeds fed by database servers such as database server 54 shown in FIG. 3 or the different database servers shown in FIG. 6.

Figure 3:
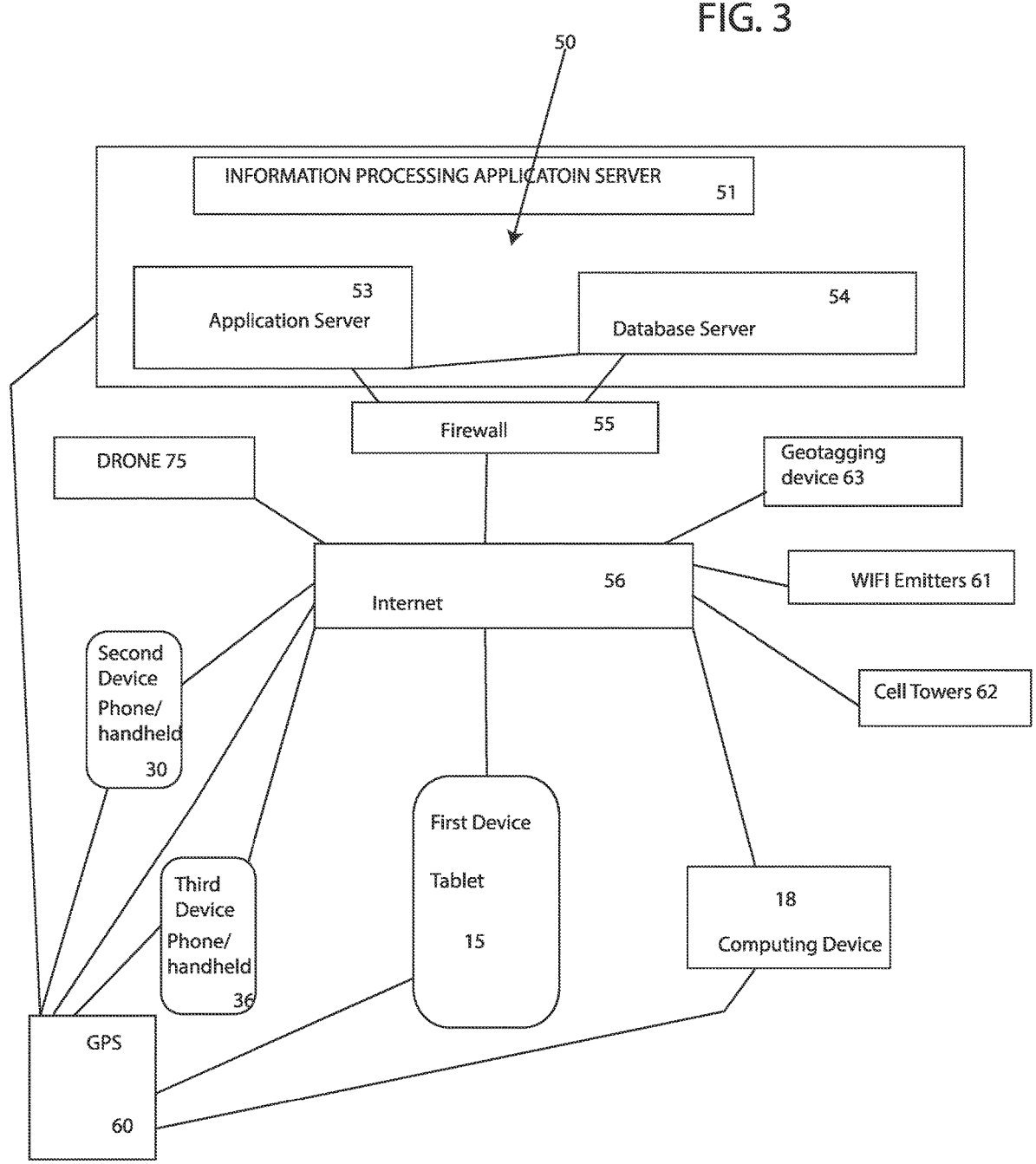
FIG. 3 is a schematic block diagram of the computer network for the development location.

Next, in step S5 the system can send drones to map the region for re-development. This is an optional step wherein the pictures and/or video taken by a drone such as drone 75 shown in FIG. 3 is input into the system. Alternatively, in step S6, maps can be pulled into the system and stored into the database so that maps that are taken from generally recognized commercial databases are imported and stored in a server. In this embodiment the drones can log the GPS coordinates that are being tracked.

Next, in step S7, a map is constructed laying out the plot plan such as that shown in FIG. 2 of the site for re-development. The map that is constructed would show the building locations, city or town blocs, streets, monuments places of interest, etc.

Next, once the map is constructed, in step S8, the system would geotag locations on the map. This geotagging includes importing information about places of interest, pinpointing particular locations, regions or GPS coordinates for monuments, stores, or areas of interest. In addition, during this step of geotagging, the system can import geo specific data into the system via a geotag device such as geotag device 63. The geotag device 63 can be any form of suitable geotag device such as a system to record foot traffic, automobile traffic, noise pollution, demographics etc. One example for a geotagging device 63 would be a camera connected to a sensor which feeds foot traffic information to a server for recording of such foot traffic information for later storage.

Because re-development can be a sensitive issue in a general region, such as a community downtown, the system or user can open up to the community for comments on the re-development plan in step S9. This opening up for comments can be in the form of placing a kiosk at particular locations in the zone of re-development, or by soliciting comments via a website or via a townhall meeting. Once the comments are aggregated, sorted and reviewed, they can be re-presented to the community for voting on the preferences by the community. That voting on the preferences by the community can be through an online voting system conducted by the members of the community.

Next, in step S10, the system can rank the comments/preferences of the community based upon the voting presented by the community.

Next, in step S11, a user or the system can set the preferences for re-development based upon the needs or comments from the user. The guidelines for setting these preferences can be governed by internal metrics such as the zoning regulations, economic impact, social impact, or environmental impact of the preferences on the re-design. With this system, the zoning rules would be imported into the system and stored in a database server on the system such as in database server 54. These metrics can include a weighted score for weighing or setting a preference for each of the comments or categories based upon these metrics.

Next, in step S12, once the preferences are set, the system such as the microprocessor can then create the design. For example, the information processing application server 51 can consult or contact application server 53 to coordinate the creation of buildings and then place these buildings on a map such as the map that was created in steps S7 and S8. The preferences can be set by a weighted average or a ranking set to the basic criteria listed above for Social, Environmental and Economic change based upon the re-development, wherein these criteria are shown in greater detail in FIGS. 13, 14, and 15.

Next, the system and/or user can present this initial design to the Community and Municipality in step S13. Based upon feedback from the Community and Municipality the system can then either finalize the design in step S14, or revert back to step S12 for a re-design of the proposed improvement. If the Community or Municipality rejects the design, either the developer or an architect could re-design a specific building or re-assess the criteria used for the development and either re-rank the Social, Environmental and Economic criteria or re-weight these criteria shown in FIGS. 13, 14, 15 to create using the system a new re-design for the location.

Once all of the requirements have been satisfied, and the Community or Municipality approves the re-development project, the system can then move to step S14 to finalize the design. This design would then be implemented through collaboration with architects, developers and construction companies as well as the municipality overseeing the re-development project.

As indicated above, FIG. 2 is a plan view of the three-dimensional model of the real estate development location. With this view there is shown a region for re-development 10 having a plot 11 having a series of different buildings 11a, 11b, 11c, 11 d, 11e, 11f, 11g, 11h, 11i, 11j etc. These buildings are placed on a street such as street 12 and also other streets such as cross-streets 13. The metes and bounds of the region can be created via street addresses as indicated above or via pre-set GPS coordinates such as that shown herein such as GPS coordinates 14a, 14b, 14c, and 14d. These GPS coordinates or points 14a, 14b, 14c and 14d can also be pre-set points of interest or pre-selected regions selected by a user graphically on a map.

FIG. 3 is a schematic block diagram of the computer network for the development site. For example, there is shown a set of servers 50 which includes an information processing application server 51 which is in communication with an application server 53, and a database server 54 either in a closed local network or through a wide area network such as the internet 56. In the case that the information processing server 51 as well as the application server 53 and the database server is on a local area network, these servers are disposed behind a firewall such as firewall 55. In the case that these servers are distributed in the cloud, each of these servers would then communicate with each other through the internet such as internet 56. The information processing application server 51 is configured to control any one of the different application servers 53A, 53B, and 53C shown in FIG. 4 as well as any one of the database servers 54 shown in FIG. 6.

In addition, or alternatively in communication with this network and coupled to firewall 55 is internet 56. Coupled to internet 56 is drone 75, geotagging device 63, WIFI emitters 61, cell towers 62, GPS 60. The WIFI emitters, cell towers 62 and GPS 60 such as GPS satellites can be used to triangulate or designate locations on a map such as the map shown in FIG. 2. In addition, in communication with these devices are a plurality of distributed devices which are configured to provide for input of data into the system such as a first handheld device 15, a second device 30 and a third device 36. These devices can be in the form of a phone such as a smart phone having electronic components such as that shown in FIG. 7A. Another distributed device can be in the form of a personal computer such as computing device 18.

Figure 4:
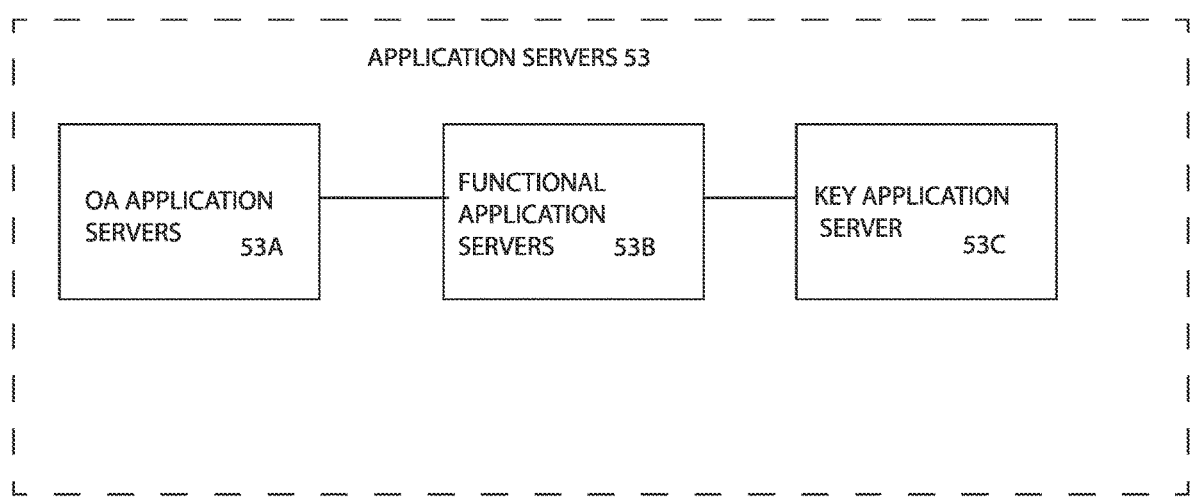
FIG. 4 is a schematic block diagram of the application servers shown in FIG. 3.

FIG. 4 is a schematic block diagram of the application servers shown in FIG. 3. These different application servers can include an open architecture (OA) application server 53A, a functional application server 53B and a key application server 53c. The OA application server(s) 53A can be any one of the following application servers NREL (National renewable energy resources laboratory server), the AARP livability index servers, and any other government servers. Other types of OA servers can include a search engine, online encyclopedias, Universities and research organizations, Trusts, foundations, Public health benefit sites, and climate change feedback cloud servers.

The functional application servers 53B can include any of the suitable functional application servers such as a three-dimensional animation software server for the creation of visual effects in film, games, as well as other software. On example would be Houdini® application server. Other examples would be a mapping software server system or API such as Cesium Globe®. Other such types of servers or web services can include Cube®, carbon calculators, Social Media such as Twitter®, Facebook® etc., online funding sources, non-profits, LumenRT®, Autodesk Infrastructure 360®, Enscape®, Unreal Engine®, and Unity® for example.

Figure 5:
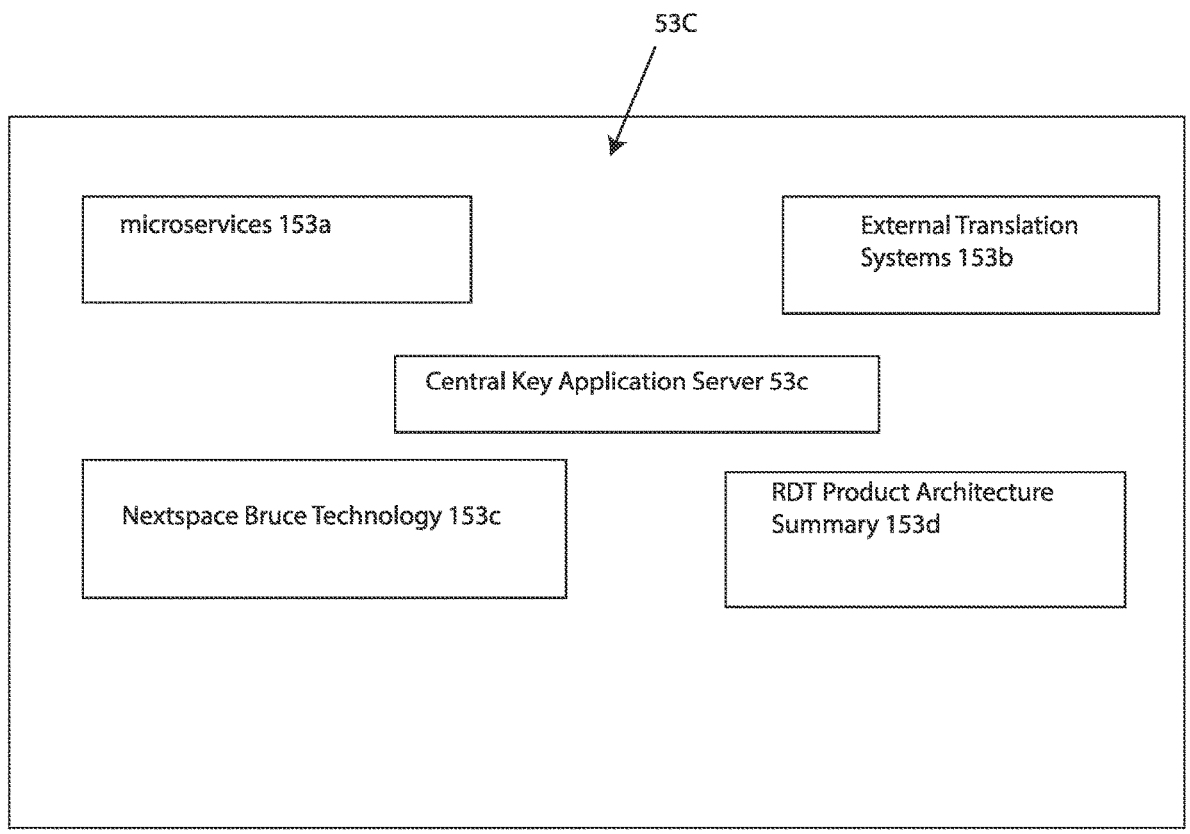
FIG. 5 is a schematic block diagram of the key application servers.

The key application server could be in the form of a visual and content management platform or Nextspace which has a core API or Rest framework. For example, FIG. 5 is a schematic block diagram of the key application servers; which includes a central Key Application server 53c, which is surrounded by different other application servers such as microservices 153a, external translation systems 153b, Nextspace Bruce technology 153c, and RDT product architecture summary 153d. This key application server 53c is configured to pull all of this information together to then forward this information onto the information processing application server 51.

Figure 6:
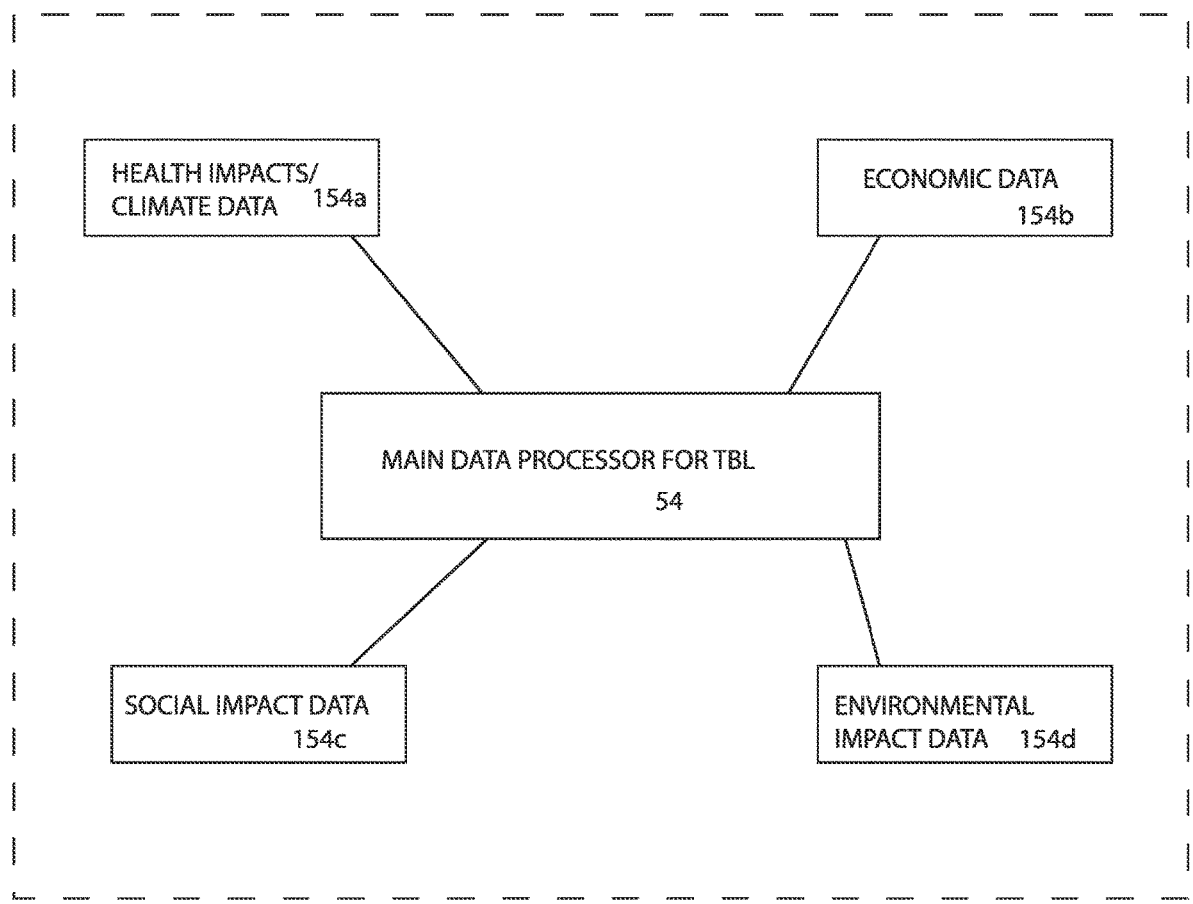
FIG. 6 is a schematic block diagram of the different data inputs for the database servers shown in FIG. 3.

FIG. 6 is a schematic block diagram of the different data inputs for the database servers shown in FIG. 3. For example, this layout shows the different data feeds that can be fed into the system which then forms the database system 54. For example, there is a health impacts and climate data feed 154a which can be a feed of the potential health impacts and climate impacts of the construction/redevelopment project. There is also an economic data feed 154b which can comprise a feed to help the system/user to determine the economic impact of the redevelopment plan for the site. There is also an environmental impact data feed 154d which is configured to receive data on the environmental impact from redeveloping the site. Next, there is a social impact data feed 154c which is configured to indicate the social impact of the re-development such as a feed associated with community input as well as social metrics such as walkability, likely social interactions, restaurants, community events, cultural centers etc. All of these data fees are then fed into a main data processor or database 54 which is configured to then feed into the application server 53 or the information processing application server 51.

Figure 7A:
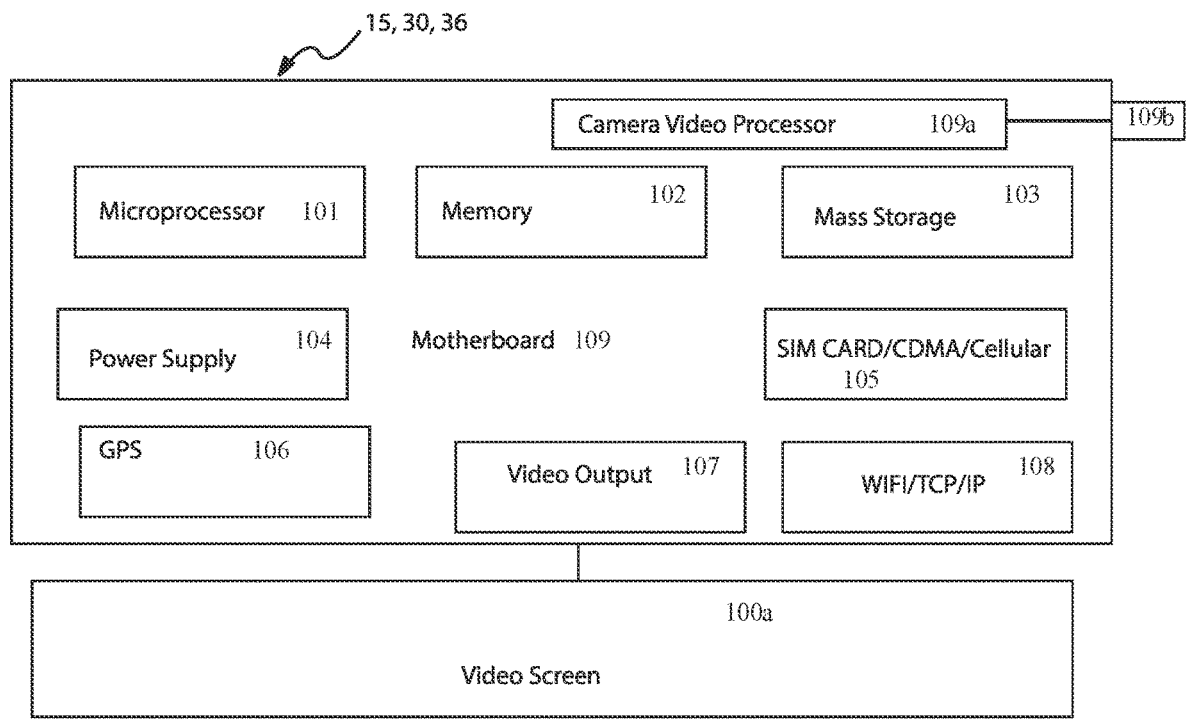
FIG. 7A is a diagram of the portable computing devices shown in FIG. 3.

FIG. 7A is a diagram of the portable computing devices shown in FIG. 3, particularly the portable computing devices 15, 30 and 36 which can be used to either control or relay information from a drone 75 or to plot GPS data with associated GPS satellites 60 as well. For example, there is shown a motherboard 109 which is configured to house, power and control the following components, a microprocessor 101, a memory 102, a mass storage or hard drive 103, a power supply 104, a SIM Card 105, a GPS 106, a video output 107, a WIFI or communications port 108, and a video screen 100a. With this design, the GPS chip 106 can be used to communicate with outside GPS satellites 60 (See FIG. 3) to log and set the boundaries of the designated area. For example, in at least one embodiment, a user carrying a handheld device such as a cell phone, can walk the perimeter of a region to be assessed, marking the region using GPS coordinates, to determine a particular area for re-development. Alternatively, the portable device such as device 15, 30, 36 can communicate with Cell towers 62 (See FIG. 3) using the SIM/CDMA card 105, or communicate and triangulate with WIFI hotspots to alternatively determine the metes and bounds of a geographic area to be certified. The pictures taken by the portable device can also be geospatially tagged so that these pictures or LIDAR images can be then imported into the system to re-create the plot plan of the region for review for re-development.

Figure 7B:
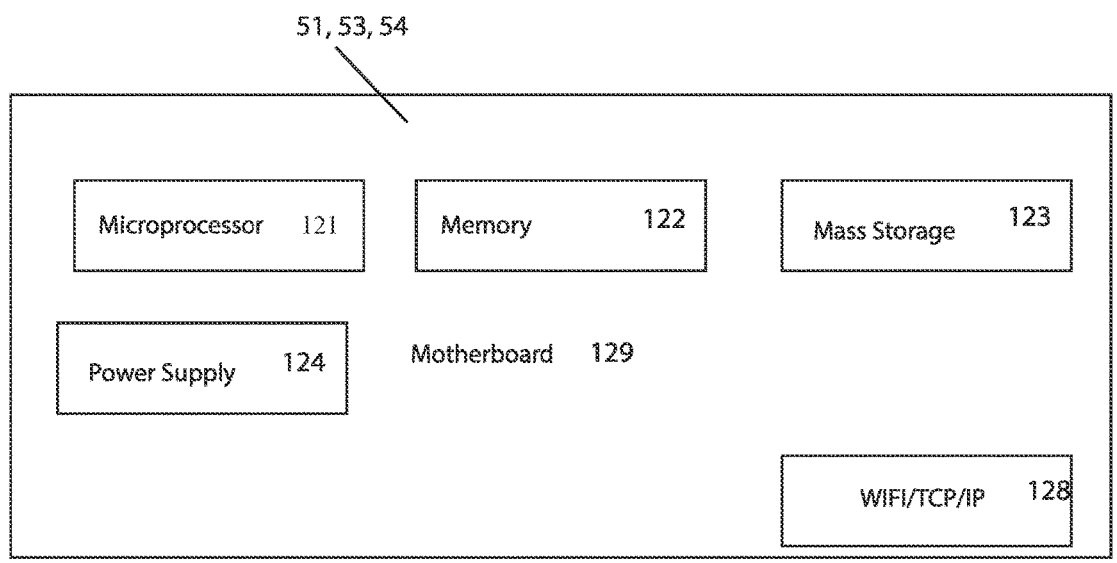
FIG. 7B is a diagram of the server(s) shown in FIG. 3.

FIG. 7B is a diagram of the server(s) shown in FIG. 3; which is the schematic layout for the servers such as servers 51, 53, and 54. The components for these servers such as servers 51, 53, and 54 would include a mother board 129, a microprocessor 121, a memory 122, a mass storage or hard drive 123 a power supply 124, and at least a communications port 128. Other components can include input and output ports if necessary as well as video ports. With this design, the microprocessor 121 is configured to carry out the instructions performed by the system such as the process associated with FIG. 1 as well as the process associated with FIGS. 8 and 9. In at least one embodiment, instructions in the form of a computer program can be fed from mass storage 123, to memory 122 and then into microprocessor 121. The microprocessor 121 uses these instructions to decide for example which location to choose, the height or size of the buildings in the redevelopment, or the general layout of the map as based upon a pre-set set of instructions stored in mass storage 123, fed into memory 122 or stored in database server(s) 54 and then fed to either the application server(s) 53, or the information processing servers 51.

FIG. 8 is a diagram of the flow chart for the further steps for selecting and evaluating a location for development. This flow chart is a further elaboration of the process set forth in steps S2 and S3. For example, in step 101 a location can be first selected near a transportation hub. With this step, the system can search through the publicly available records to determine all of the locations that have a central transportation hub. Next, in step S102 the system can then look preliminarily at the region and evaluate the region based upon the social ranking criteria discussed above and shown as criteria in table 1301 in FIG. 13. Next, in step S103, the system can evaluate the location based upon the potential for the social ranking once the re-development takes place. This is based upon the change in criteria set forth based upon an expected rate of return based upon the re-development. This expected change can be based upon the stored legislation for re-development and other stored factors which lead the system to determine the expected return on social change from re-development. Next, in step S104, the system can evaluate the location based upon the current economic factors. These economic factors are those factors listed in table 1501 shown in FIG. 15. Next, in step 105, the system can evaluate the location based upon the expected change in economic activity based upon the re-development. This expected change can be based upon the change in economic activity created by past re-developments, government related statistics on open databases as well as projected earnings changes from the increased activity from re-development. Next in step S106 the system can evaluate the location based upon the current environmental ranking based upon the environmental criteria listed above and shown as criteria in table 1401 in FIG. 14. Next, in step S107, the system can estimate the potential environmental benefit based upon the above pre-set criteria. This estimate can be based upon the environmental benefit obtained by past re-development projects, using generally available environmental benefit criteria from open databased or other types of government or publicly available data. In at least one embodiment, the system can identify an average environmental change among a plurality of different sites as well as a plurality of individual buildings in each site. Based upon the averages formed in each of these individual buildings or each site, the system can determine the social, environmental, and economic impact based upon the change in the site from before the proposed re-development and after the proposed re-development.

One example is if the square footage of the building has changed this would likely result in a change in tax revenue on the building. If the zoning change of the building or region of buildings was changed then this could be used to determine the tax changes for the building changes and zoning changes.

For example, if a zone for re-development was to take a former industrial site and turn it into mixed use commercial, retail and residential, the square footage of each of these different buildings zoned commercial, the square footage of the proposed buildings for retail and the square footage for the proposed residential buildings would be analyzed for changes in tax, revenue. In addition, with respect to the environmental impact if the site was formerly industrial, and the re-development required remediation, then the average results of previous remediation examples could be used to determine the potential environmental effects of remediation for the potential remediation. Furthermore, if these new buildings were LEED certified or included solar panels, then the potential addition of solar panels The area of additional solar panels could be used to calculate the amount of potential new energy created by the re-development.

With respect to social changes the system could determine the number of new restaurants potentially created vs. the restaurants before redevelopment. The system could also determine the length of walking paths, biking paths, square footage of parks and number of new monuments vs. the non re-developed site to determine the social impact on the proposed area.

Next, in step S108 the system can match the composite score of improvement for the different factors listed above and rank this change for the Social, Economic, and Environmental change vs. the potential change to other locations. Next, in step S109, the system can select the location for development of the site based upon this potential for improvement.

Figure 9:
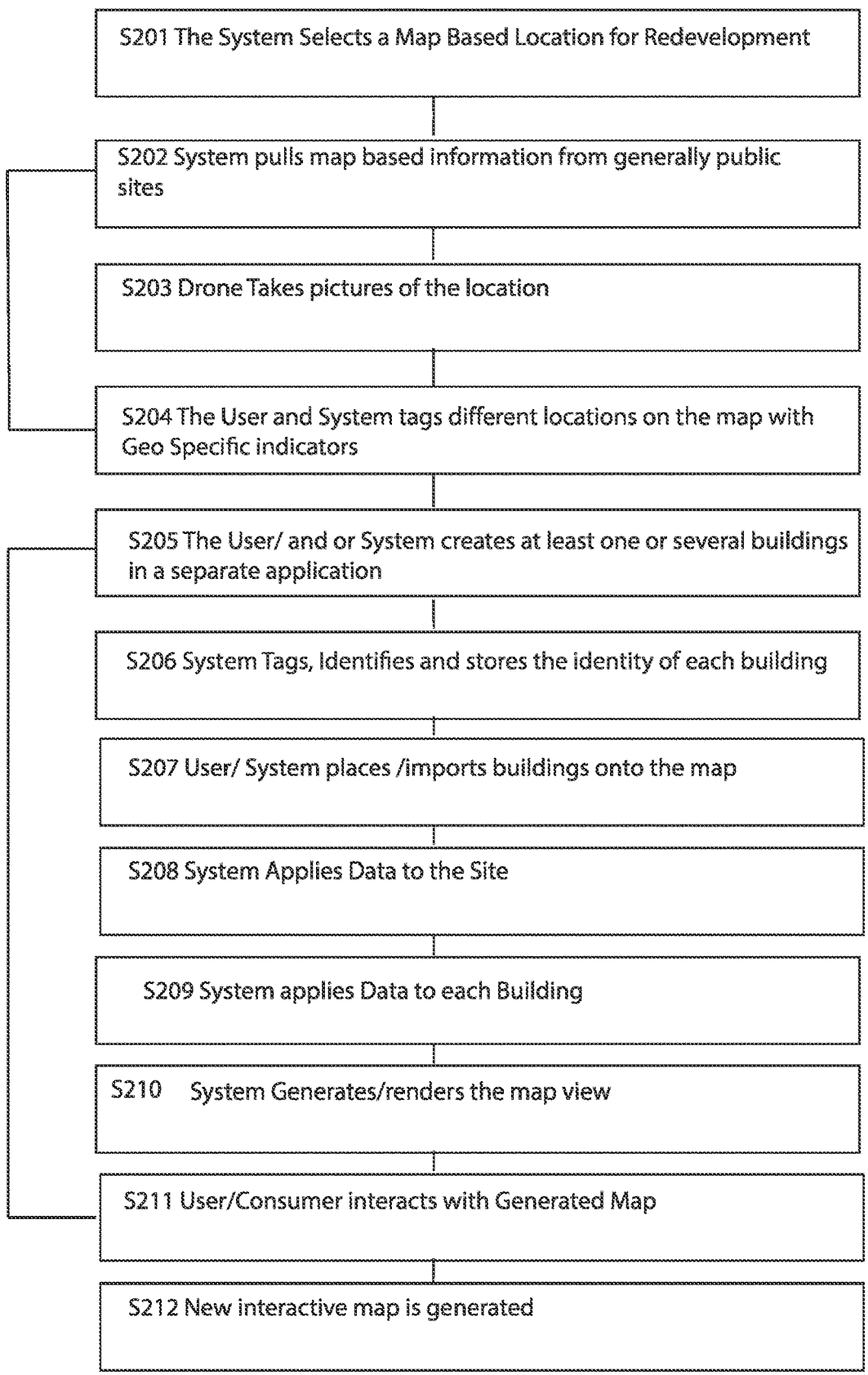
FIG. 9 is a flow chart for the process for handling assets to be created and deployed on a map and for generating a map.

FIG. 9 is the flow chart for the process for calibrating and applying building or other graphical assets to a re-development plot. This flow chart is an expansion of the steps outlined in steps S4-S8.

For example, in step S201 the system selects the map based location for redevelopment. This step is essentially similar to step S109 shown in FIG. 8. Next, in step S202, the system pulls the map information from generally available sites.

This map based information can be for example from a publicly available site such as Google® Earth. Once this basic map structure is pulled from the generally available data feed such as that shown as being pulled from the open architecture servers 53A shown in FIG. 4. This information is pulled from these servers and then stored in an associated database server 54, or in a storage medium such as a mass storage 123 in either the database server 54, or in an associated application server 53. One of the types of the application servers that this data could be imported into would be a graphical mapping server such as a Cesium® server which would import assets created in an associated graphical production server such as a Houdini® graphical generation server. Next, in step S203 the system/user could order a drone or external camera to survey the development area to then subsequently to record or take pictures of the area. The recordings of either the video or pictorial representations could then be imported into the graphical mapping server such as a graphical server 53b.

Next, in step S204 the user and the system tags the different locations on the map with Geo Space Indicators. Next, in step S205 the user creates at least one or a plurality of different buildings, or structures such as monuments, fountains or other materials. Next, in step S206 each building or object is tagged and archived and is given a serial number. The tagging of these assets such as buildings, monuments or other objects allow for the rapid generation of such structures from a library of data for future re-development projects. For example, there are many variables that can be made and then different scenarios can be made from these archived and tagged buildings. In particular each building is analyzed for dimensions including height, length and width as well as square footage of area of development for each building. In at least one embodiment, for each building, the total cost of construction, the total increase in economic activity as well as the total change in environmental as well as social factors is calculated.

Next, in step S207, the system or user places or imports these buildings onto a map. Next, in step S208, the system can apply data to the map such as the information of the size or square footage of the buildings, the Social Criteria in table 1301, the Environmental Criteria in table 1401, or the Economic Criteria in table 1501 as well. Next, in step S209 the system applies data to each of the buildings so that a user can scroll over each of the buildings of the re-development site to learn about the impact of each building on the site. Next, in step S210 the system generates or renders a map view of the site. Next, in step S211 the user/consumer interacts with this map to ether alter the buildings or the re-development plan either through graphical manipulation or data manipulation so that eventually a new re-development plan is created and then in step S212 a new interactive map is generated.

Figure 10:
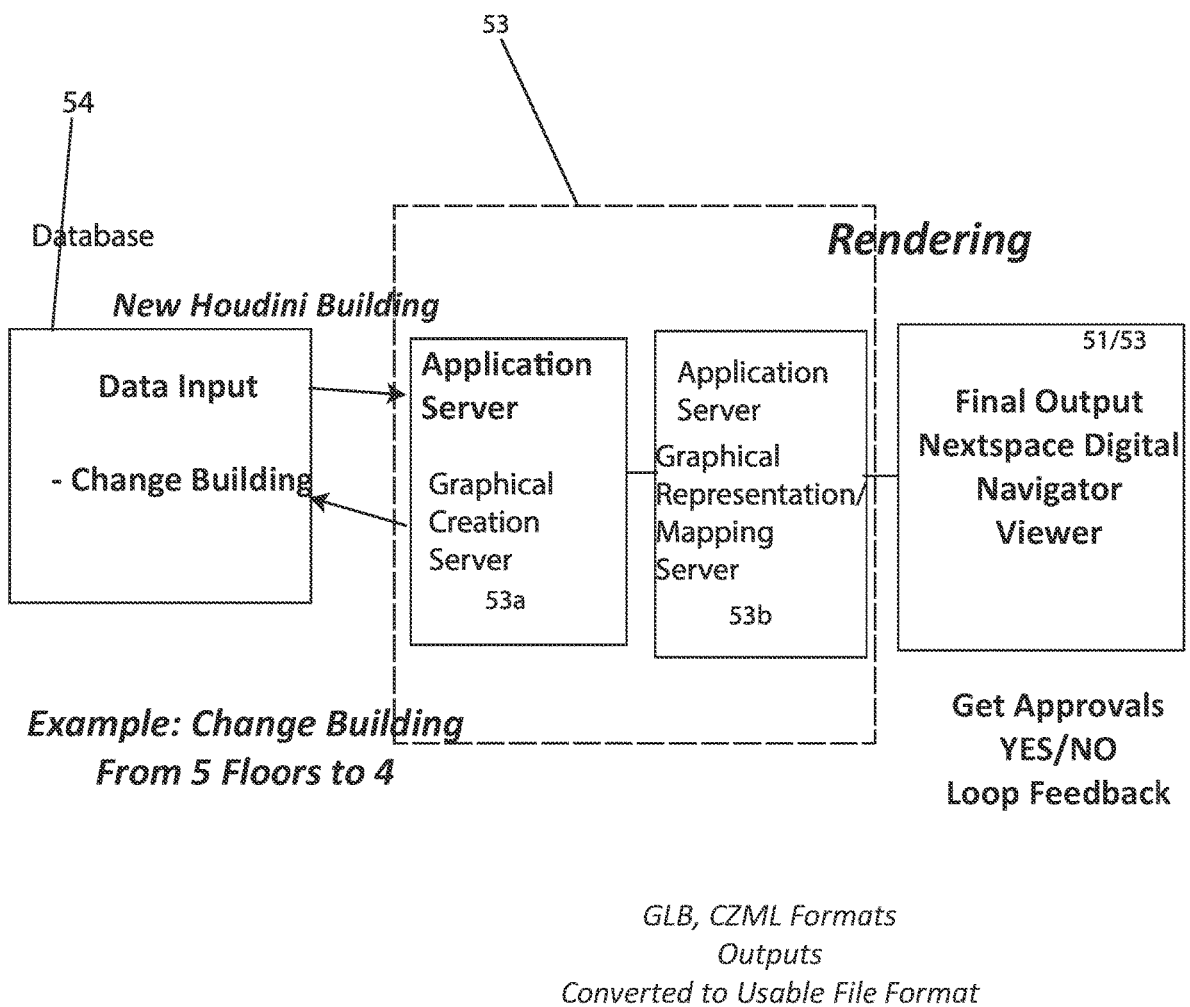
FIG. 10 is a schematic block diagram for the flow of data associated with the handling of assets associated with populating a map.

FIG. 10 is a schematic block diagram for the flow of data associated with the handling of assets associated with populating a map. This view shows the information flow which proceeds between the different servers when developing, and re-developing a site or a location. For example, there is shown a database server 54, which can either take information from, or present information to an application server 53 such as a graphical creation server 253a, or a graphical mapping server 253b. The graphical creation server can be in the form of a cloud server provided by Houdinii®, while the graphical mapping server can be a mapping server or API provided by the provider Cesiium®. Once the assets such as buildings or other materials are placed on the map the visual image can be rendered using rendering software and then presented on a final output Nextspace Ditital navigator viewer on server 253*a*.

Figure 11A:
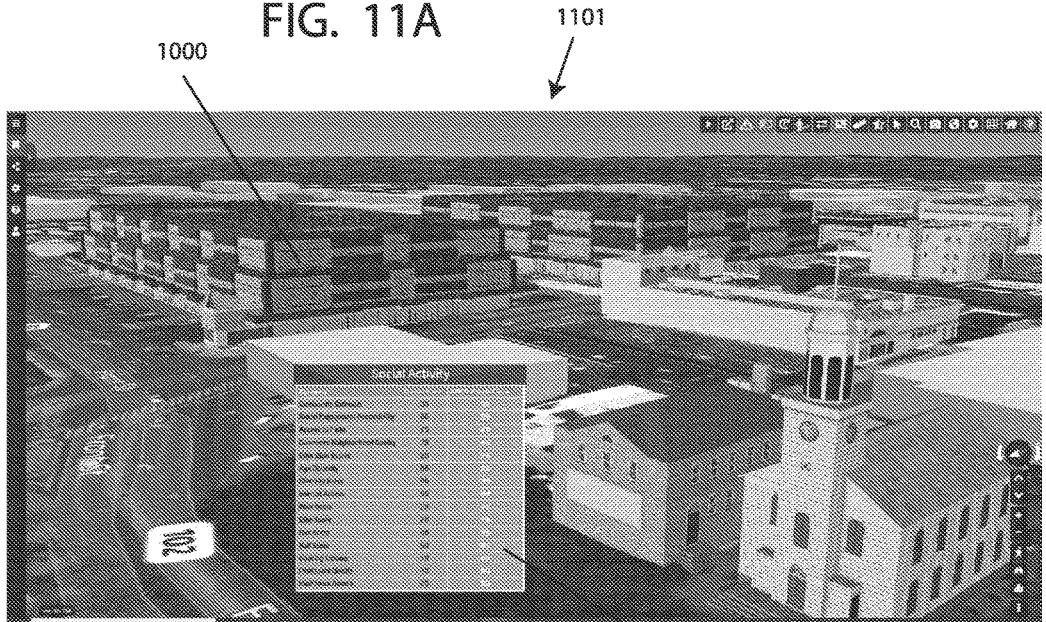
FIG. 11A is a first view of a populated map.

Examples of these final outputs are shown in FIG. 11A is a first view of a populated map, which shows a rendering of a downtown as a three dimensional image with a Social Activity score placed thereon. An example of a Social Activity Score is shown in FIG. 13 as table 1301.

Figure 11B:
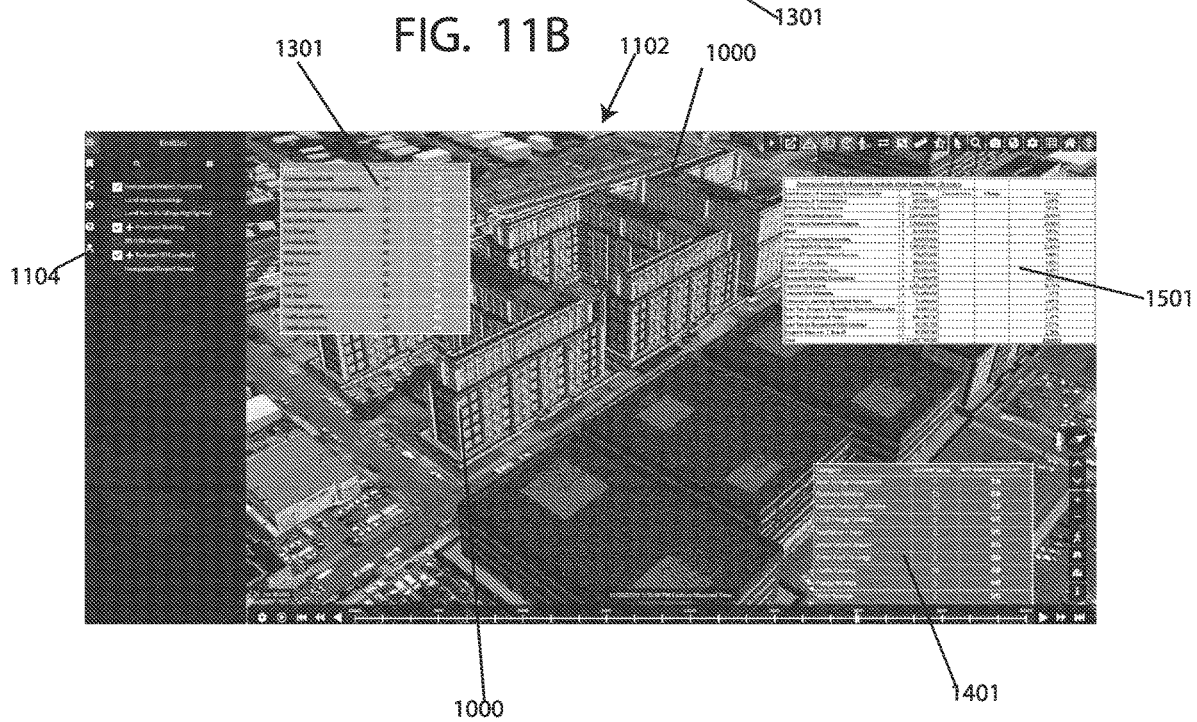
FIG. 11B is a second view of a populated map.

FIG. 11B is a second view of a populated map which has a three-dimensional rendering showing three different scores based upon Social (table 1301), Environmental (table 1401) and Economic Activity (table 1501) shown in greater detail in FIGS. 13-15. In addition, also shown along the left column are listings of entities 1104 in a left hand column.

Figure 12A:
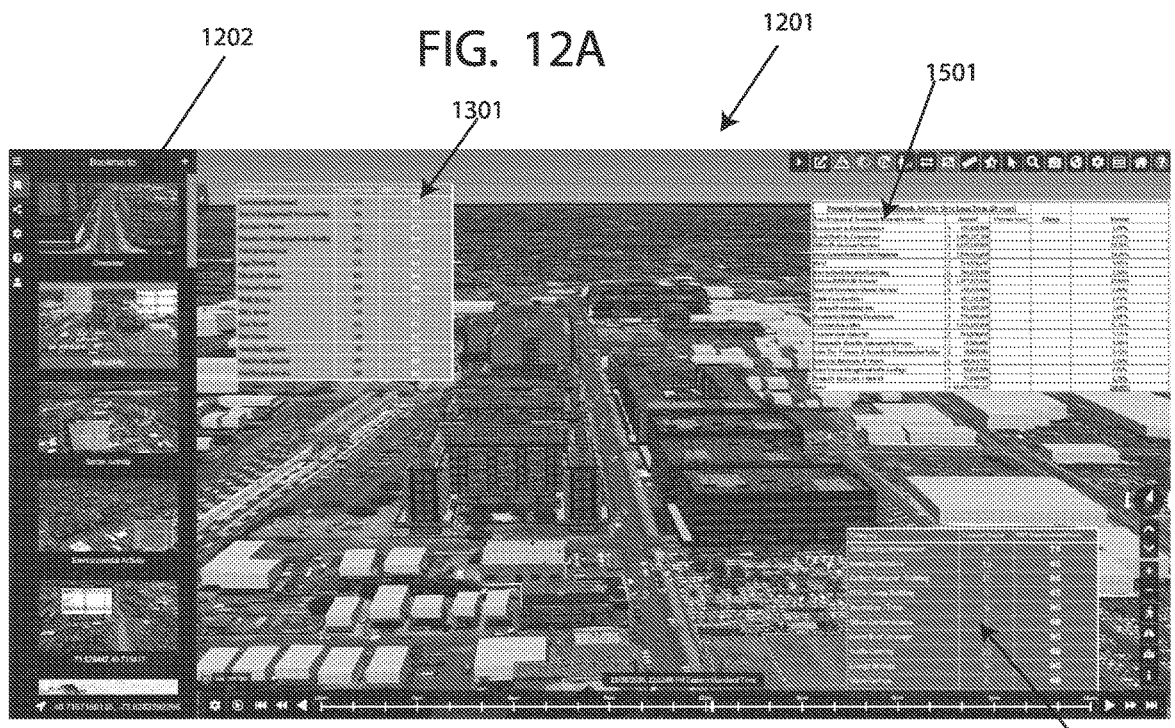
FIG. 12A is another view of a populated map.

FIG. 12A is another view of a populated map 1201 which shows the three dimensional rendering of the downtown with individual buildings, the three different sets of criteria shown in FIGS. 13-15 as shown in tables 1301, 1401, and 1501, as well as additional angled views 1202 shown along the left hand side.

Figure 12B:
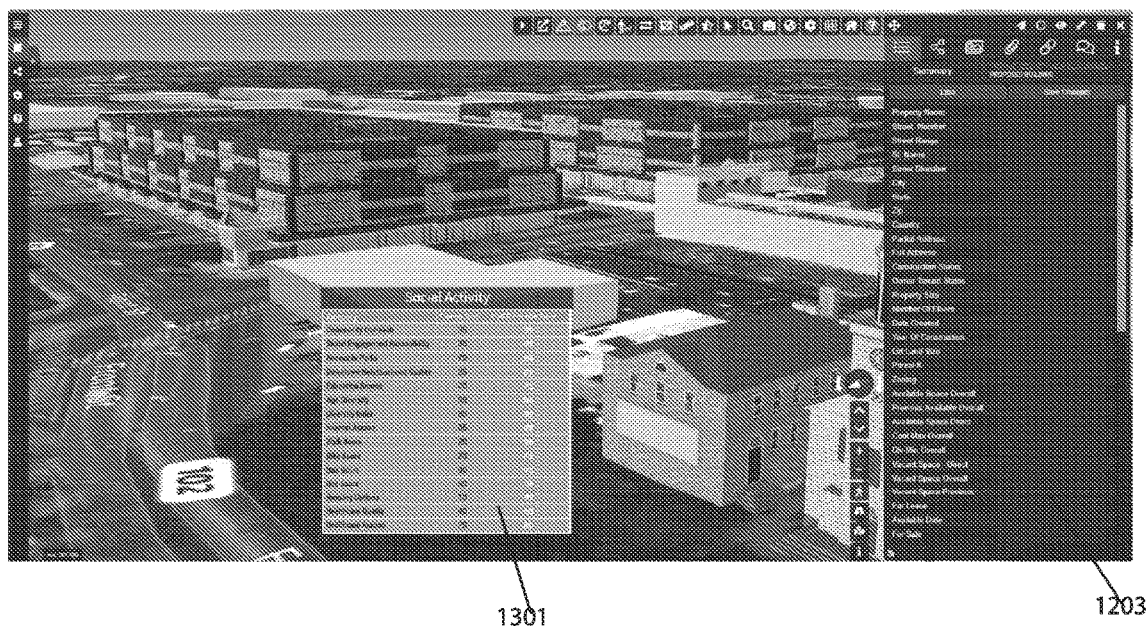
FIG. 12B is another view of a populated map.

FIG. 12B is another view of a populated map which shows a first set of criteria for social activity in table 1301 along with a right hand tool bar 1203 to provide more detailed information of the development region.

FIG. 13 is a view of a chart or table 1301 for social implications for development. The criteria listed were described above and can include but are not limited to those criteria listed above.

FIG. 14 is a view of a chart or table 1401 for the environmental implications for development. The criteria listed were described above and include but are not limited to the criteria listed above.

FIG. 15 is a flow of a chart or table 1501 for the economic implications for development. The criteria listed were described above and include but are not limited to the criteria listed above.

In all the system and process is configured to create a three-dimensional rendering of a re-development plan that can be rapidly rendered, changed, and then re-designed based upon different criteria such as Social, Environmental and Economic Criteria. The renderings can be rapidly changed using the system's algorithms and based upon additional information presented to the system or based upon a re-ranking of the criteria listed or re-weighting of the criteria listed, or based upon individual changes by a developer or architect or urban planner to a particular building, monument, road or point of interest on the map. The new development can then be rapidly re-rendered and created for the community to review.

Accordingly, while at least one embodiment of the present invention have been shown and described, it is to be understood that many changes and modifications may be made thereunto without departing from the spirit and scope of the invention as defined in the appended claims.

What is claimed is:

1. A process for creating a graphical representation of a location comprising:
    creating an initial boundary outline of a location based upon GPS coordinates;
    storing said initial boundary outline in a database as a location for review;
    locating said location for review based upon a primary criteria wherein the process includes evaluating with a microprocessor a list of said criteria to weigh in a selection and then applying a weight of this primary criteria in selecting the location;
    evaluating using the microprocessor the location in its current state based upon social criteria;
    evaluating using the microprocessor the location in its current state based upon environmental criteria;
    evaluating the location in its current state based upon economic criteria;
    inputting an initial set of data associated with a development plan of the area resulting in a three-dimensional representation of the plan including presenting buildings;
    automatically presenting at least one table of data associated with the social, environmental, and or economic criteria;
    altering the initial set of data such that the microprocessor alters the three-dimensional representation of the redevelopment plan including altering buildings and automatically re-calculates data associated with at least one table of said social, environmental and or economic criteria to render at least one new table of data associated with the social, environmental and or economic criteria.

2. The process as in claim 1, wherein the primary criteria comprises determining whether the location is adjacent to a transportation hub.

3. The process as in claim 1, wherein the social criteria is determined based upon one or more of the following factors: community outreach, social engagement, accessibility, access to parks, neighborhood quality, education scores, age diversity, diversity index, internet access, walk or walkability score, bike score, bus score, rail score, housing options, healthcare quality, and healthcare access.

4. The process as in claim 3, wherein the process includes evaluating at least one social criteria before the proposed redevelopment plan and then evaluating the same social criteria after the proposed redevelopment plan.

5. The process as in claim 1, wherein the environmental criteria is determined based upon one or more of the following factors: solar energy, roadway pollution, carbon footprint, LEED score, shade coverage, congestion, vegetation, urban garden access, green roof access, traffic, energy savings, water savings.

6. The process as in claim 5, wherein the process includes evaluating at least one environmental criteria before the proposed redevelopment plan and then evaluating the same environmental criteria after the proposed redevelopment plan.

7. The process as in claim 1, wherein the economic criteria is determined based upon one or more of the following factors: tax change, sales tax revenue, non construction economic activity, total construction materials, labor construction activity, community benefit agreements, total constructions jobs, new non construction jobs created, new retail space created, new office space created, new hospitality space created, new healthcare space created, new restaurants created, new education spending, and new housing typologies.

8. The process as in claim 7, wherein the process includes evaluating at least one economic criteria before the proposed redevelopment plan and the evaluating the same economic criteria after the proposed redevelopment plan.

9. The process as in claim 1 further comprising the step of sending out drones to map said initial boundary of a location.

10. The process as in claim 9, further comprising the step of photographing a location using the drones.

11. The process as in claim 10, further comprising the step of laying out a plot plan for the location for redevelopment.

12. The process as in claim 11, wherein said plot plan includes buildings, locations, streets, and places of interest.

13. The process as in claim 12, further comprising the step of geotagging locations on the map.

14. The process as in claim 13, wherein said step of geotagging the locations comprises attaching GPS coordinates to building locations, areas of interests, and then applying labels to each geotag.

15. The process as in claim 1, further comprising the step of receiving comments from a community regarding requests for redevelopment.

16. The process as in claim 15, further comprising the step of applying preferences to each of said comments from the community based upon a set of internal metrics.

17. The process as in claim 16, further comprising the step of using the microprocessor for generating models of new buildings or repurposed buildings to occupy existing undeveloped spaces or to be placed in the location of existing buildings.

18. The process as in claim 17, wherein these buildings are presented in a form of a graphical representation of a plot of the location on a video screen.

19. The process as in claim 1, further comprising the step of interacting with said three-dimensional representation through graphical manipulation to change at least one building to change at least one of said social, environmental, and economic data and then automatically changing at least one table of data associated with social criteria, environmental criteria, and or economic criteria.

20. The process as in claim 19, wherein said step of graphical manipulation of at least one building causes a change in square footage of that building.

21. The process as in claim 19, wherein said step of changing at least one building includes changing a number of floors on that building.

22. The process as in claim 1, wherein said step of altering buildings includes altering a square footage of buildings.

23. The process as in claim 1, wherein said step of altering buildings includes altering a number of floors on a building.

24. The process as in claim 1, wherein prior to the step of: evaluating the location in its future re-developed state based upon future social criteria, the microprocessor performs the step of:
determining whether the location is suitable for redevelopment and if the location is suitable for redevelopment the microprocessor proceeds to the step of inputting an initial set of data associated with a development plan of the area resulting in a three-dimensional representation of the plan including presenting buildings;
if the microprocessor determines the location is unsuitable for redevelopment, the microprocessor proceeds back to the step of creating an initial boundary outline of a location based upon GPS coordinates.

25. The process as in claim 24, wherein said step of determining whether the location is suitable for redevelopment includes determining whether the area is a high traffic location.

26. A process for evaluating an area comprising:
creating an initial boundary outline of said area based upon geographical boundaries;
storing said initial boundary outline in a database as an area for review;
pre-selecting said area
using the microprocessor for evaluating current social criteria for the area;
using the microprocessor for evaluating current environmental criteria for the area;
using the microprocessor for evaluating current economic criteria for the area;
having said microprocessor use said current social criteria, environmental criteria and social criteria to select an area for re-development;
inputting an initial set of data associated with a development plan of the area creating a graphical three-dimensional representation of the plan including presenting buildings and all associated project area elements:
upon the creation of a graphical three-dimensional representation of the area plan;
using the microprocessor for re-evaluating social criteria for the area plan;
using the microprocessor for re-evaluating environmental criteria for the area plan;
using the microprocessor for re-evaluating economic criteria for the area plan;
upon the creation of any future graphical three-dimensional modifications to the initial area plan that re-evaluated the social, environmental and economic criteria for the plan;
using the microprocessor for further re-evaluation of social criteria for the area plan;
using the microprocessor for further re-evaluation of environmental criteria for the area plan;
using the microprocessor for further re-evaluation of economic criteria for the area plan, and
displaying said social, environmental and economic criteria adjacent to the graphical three-dimensional representation of the area.

27. The process as in claim 26, wherein said geographical boundaries comprises at least one of GPS coordinates, street addresses or at least one point on a map.

* * * * *